(12) United States Patent
Glynn

(10) Patent No.: US 6,565,241 B1
(45) Date of Patent: May 20, 2003

(54) MOTORIZED VEHICLE WITH CONVERTIBLE HEADLIGHT/FLASHLIGHT

(76) Inventor: Alex P. Glynn, 29 Plennert Rd., Flemington, Hunterdon County, NJ (US) 08822

( * ) Notice: Subject to any disclaimer, the term of this patent is extended or adjusted under 35 U.S.C. 154(b) by 0 days.

(21) Appl. No.: 10/023,078

(22) Filed: Dec. 17, 2001

(51) Int. Cl.[7] ............................................. F21V 33/00
(52) U.S. Cl. ...................... 362/475; 362/476; 362/190; 362/191; 362/183
(58) Field of Search ................................. 362/183, 475, 362/476, 190, 191

(56) References Cited

U.S. PATENT DOCUMENTS

| | | | | |
|---|---|---|---|---|
| 4,345,304 A | * | 8/1982 | Penney et al. ............... | 362/183 |
| 4,463,283 A | * | 7/1984 | Penney et al. ................ | 315/87 |
| 4,625,264 A | * | 11/1986 | Nagashima ................... | 362/72 |
| 4,722,031 A | * | 1/1988 | Matsuyama et al. .......... | 362/72 |
| 4,859,982 A | * | 8/1989 | Seaburg ....................... | 340/475 |
| 5,434,758 A | * | 7/1995 | Zeidler ......................... | 362/80 |
| 5,455,751 A | * | 10/1995 | Lynch et al. ................. | 362/194 |
| 5,833,534 A | * | 11/1998 | Lai .............................. | 362/72 |
| 6,428,192 B1 | * | 8/2002 | Chen ........................... | 362/247 |

* cited by examiner

Primary Examiner—Sandra O'Shea
Assistant Examiner—Jacob Y. Choi
(74) Attorney, Agent, or Firm—Kenneth P. Glynn, Esq.

(57) ABSTRACT

The present invention is an improvement to any motorized vehicle for human transport having an electrical system with at least one headlight. The improvement includes a flashlight base to which a headlight is connected, referred to herein as the flash-headlight. The base and flash-headlight are removably mounted on the vehicle, and the base has a rechargeable energy pack, e.g., a cell or battery pack for powering the flash-headlight when removed from the vehicle. The base has an on/off switch operable when the base and flash-headlight are removed from the vehicle. There is a disconnectable powering electrical contact connected from the vehicle electrical system to the flash-headlight for powering and operation thereof when the flash-headlight is not removed from the vehicle, and adapted for disconnection from the flash-headlight for removal of base and flash-headlight from the vehicle. There is also a recharging unit for recharging the rechargeable energy pack as needed, and it has a disconnectable charger electrical contact connected therefrom to the rechargeable energy pack for operation thereof when the vehicle is operating and the base and flash-headlight are not removed from the vehicle, and adapted for disconnection from the energy pack for removal of the base and flash-headlight from the vehicle. There is a securing arrangement for removably securing the base and flash-headlight to the vehicle when mounted thereon.

20 Claims, 3 Drawing Sheets

MOTORIZED VEHICLE WITH CONVERTIBLE HEADLIGHT/FLASHLIGHT

BACKGROUND OF THE INVENTION

1. Field of the Invention

The present invention relates to motorized vehicles, and especially lightweight motorized vehicles, such as motorcycles, all terrain vehicles, and snowmobiles, but could be utilized with full size vehicles, such as autos and trucks. The present invention, more specifically, relates to motorized vehicles with electrical systems that operate at least one headlight, and wherein a headlight is removable as a flashlight unit, and thus convertible to a flashlight with its own charged energy pack, e.g. one or more batteries.

2. Information Disclosure Statement

Motorized vehicles with electrical systems for ancillary power are well known and well within the purview of the artisan. For example, boats planes autos, trucks, etc. have electrical systems which utilize some engine power to charge an energy storage unit, e.g. a battery, which in turn provides power to the vehicle electrical system. This power may be used to start vehicles electrically, as well as to power radios, lighting, headlights and taillights, signals, etc. Some vehicle electrical systems have no storage unit, but provide power directly to the vehical electrical system when operating, e.g. by direct or dynamo type powering to power lighting.

Electrically operated devices are known which rely on battery or other storage unit to operate independently of "house current", yet have chargers which recharge the device by plugging into a house current outlet. Some may be operated even as recharging is being done.

Bicycles are known to have battery operated headlights which conceivably could be removable, but these headlights are not on motorized vehicles, are not connected to a vehicle electrical system and are not rechargeable.

Notwithstanding the prior art, the present invention utilizing a headlight for the dual purpose of being a headlight and alternatively being a removable flashlight is neither taught nor rendered obvious by the prior art.

SUMMARY OF THE INVENTION

The primary objective of the present invention is to provide for a headlight that is removable from a motor vehicle and convertible to a flashlight. This will enable a user to freely move and direct lighting from the vehicle as needed. It is particularly advantageous in emergencies, nighttime excursions and the like.

The present invention is also particularly advantageous for open air vehicles (those which do not provide full enclosures for users) because such vehicles often do not use conventional finished roadways and are prone to have mechanical difficulties or minor mishaps that would not occur with on road vehicles. Also, such vehicles are not usually covered by roadside services and are often repaired/maintained by the owners or users. In all such circumstances, a handy removable headlight for nighttime use as a flashlight would be an excellent device for users. Thus, open air motorized vehicles, such as golf carts, motorbikes, motorcycles, three wheelers, all terrain vehicles, snowmobiles, light boats and aircraft would, with the present invention, provide an ever ready flashlight for emergencies and other needs.

In its broadest environment, the present invention is an improvement to any motorized vehicle for human transport having an electrical system for operation of and including at least one headlight. The improvement includes: (a) a flashlight base to which one of said to at least one headlight is connected and being referred to herein as the flash-headlight, said base and said flash-headlight being removably mounted on said vehicle, said base having a rechargeable energy pack, e.g., a cell or battery pack for powering said flash-headlight when said base and flash-headlight are removed from said vehicle, said base having an on/off switch operable when said base and flash-headlight are removed from said vehicle; (b) a disconnectable powering electrical contact connected from said vehicle electrical system to said flash-headlight for powering and operation thereof when said flash-headlight is not removed from said vehicle and a conventional headlight switch is activated, and adapted for disconnection from said flash-headlight for removal of said base and flash-headlight from said vehicle; (c) a recharging unit for recharging said rechargeable energy pack as needed, said recharging unit having a disconnectable charger electrical contact connected therefrom to said rechargeable energy pack for operation thereof when said vehicle is operating and said base and flash-headlight are not removed from said vehicle, and adapted for disconnection from said energy pack for removal of said base and flash-headlight from said vehicle; and, (d) securing means for securing said base and said flash-headlight to said vehicle when mounted thereon.

In some embodiments of the present invention, the powering electrical contact and the disconnectable charger electrical contact may be two separate sets of wiring with each having a disconnect plug, so that power to operate the headlight runs directly to the headlight, when the headlight is needed while mounted on the vehicle, and a separate wiring line from a recharger unit feeds power to the energy pack for charging, as needed. Since the base, the flash-headlight and the energy pack are all removed from the vehicle as a flashlight unit, two disconnectable contacts (one for the powering wiring and one for the charger wiring) are needed. In other embodiments, there is a single set of wires running from the vehicle electric system and charger to the energy pack and flash-headlight. This operates like conventional power drill or cell phone with a charger where the drill or phone may be used while charging or after disconnection. In these embodiments, the disconnectable electrical contact is a single contact for both functions. In yet other embodiments, there could be no loose or disconnectable wires, but metal contacts on the vehicle at the device mounting area coincidental with metal contacts on the device when it is mounted on the vehicle.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
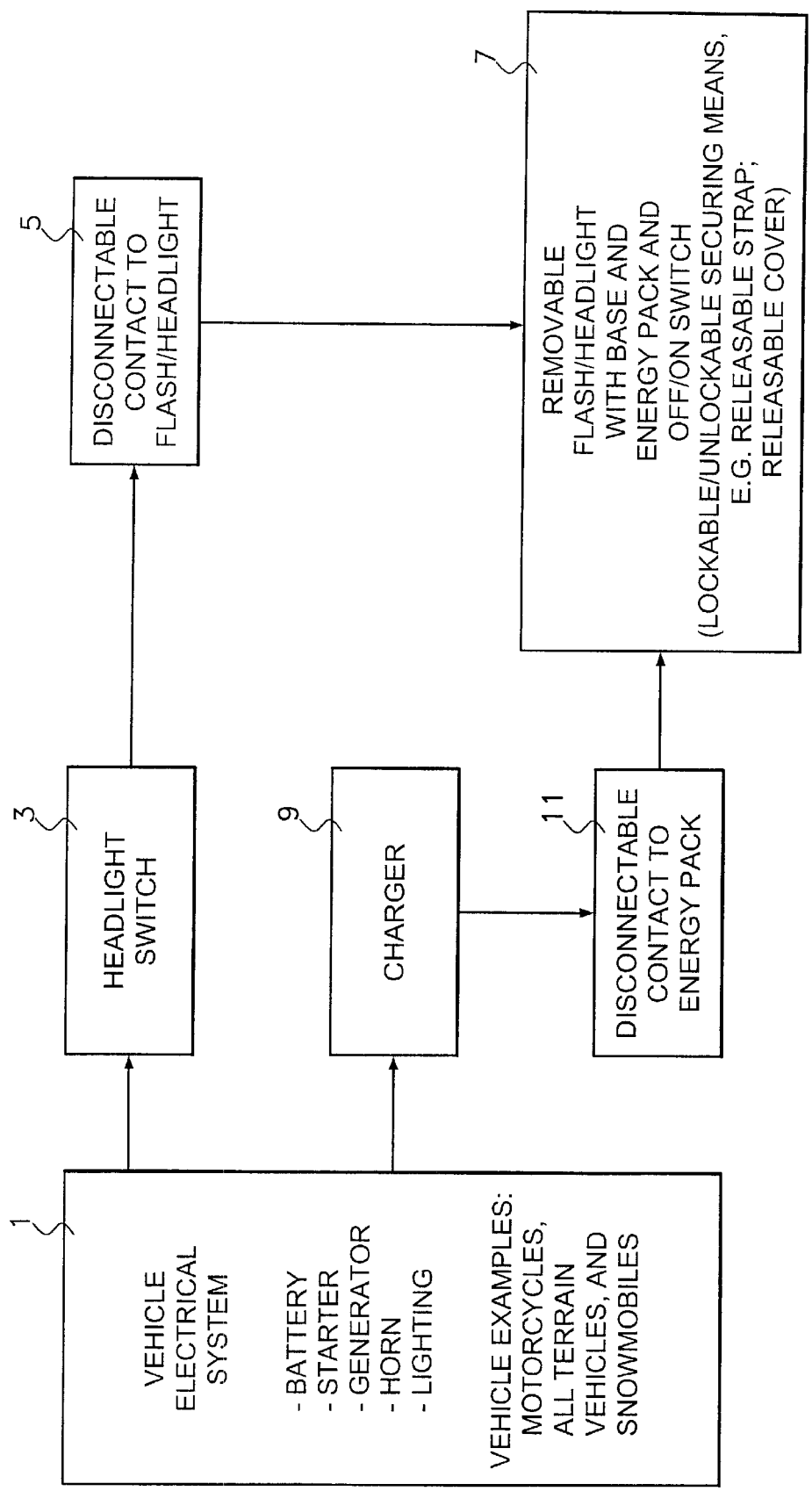
FIG. 1 illustrates a block diagram of one embodiment of the present invention motorized vehicle with a removable headlight/flashlight device.

FIG. 1 shows a schematic diagram of a preferred embodiment of the present invention device connections. It shows a vehicle electrical system 1, which typically includes a battery or other power source, e.g., a fuel cell, a starter (although some vehicles may be kick start rather than electric start), a generator, dynamo or equivalent function unit, sometimes a horn, and lighting. The type and extent of lighting depends upon the type of vehicle, e.g., off-road, in water, street registered, but minimally, there is provision for at least one headlight, which becomes the flash/headlight of the present invention. There is the normally located, on-vehicle headlight switch 3. In the present invention, switch 3 is connected to a disconnectable contact which runs to device 7, a flash/headlight with base, energy pack and its own off/on switch. Thus, when device 7 is mounted on the vehicle, it functions as a headlight using the normal switch 3.

There is also a charger 9 powered by electrical system 1 and connected to a disconnectable contact 11, which is directly or indirectly connected to the energy pack of device 7 for charging as needed. The energy pack itself, typically one or more batteries, should be removable so as to be replaceable when no longer chargeable.

Figure 2:
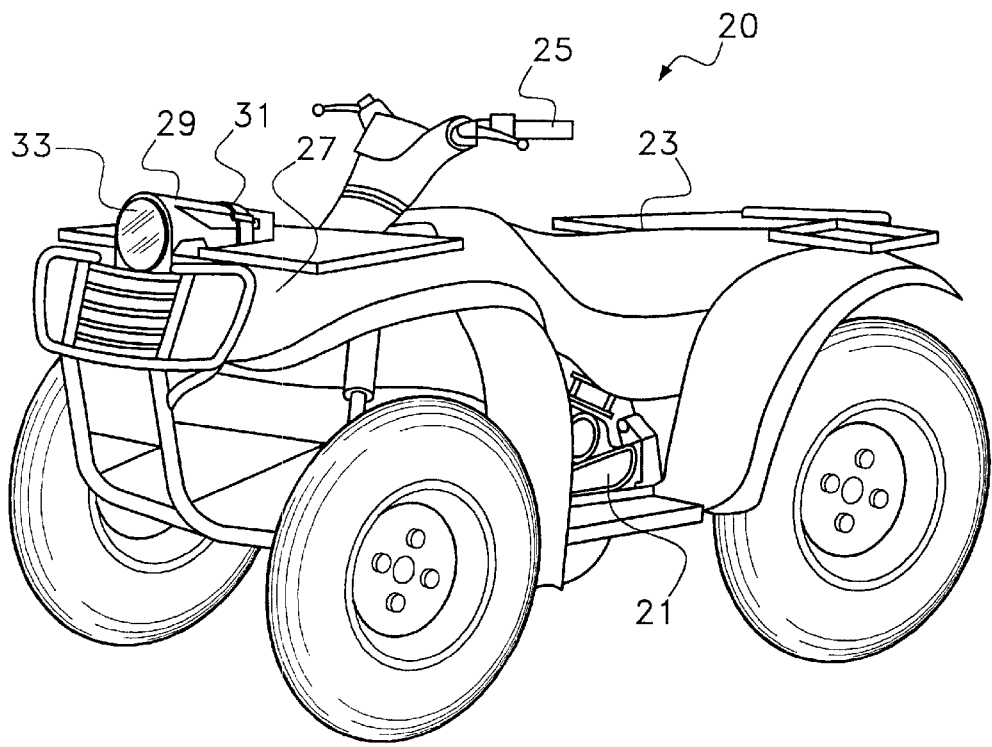
FIG. 2 shows a perspective view of a present invention all terrain vehicle and removable headlight/flashlight.

Referring now to FIG. 2, there is shown an all terrain vehicle or ATV 20, also known in the vernacular as a "four wheeler". This ATV 20 is a present invention ATV, but has most of the conventional features as seen in the Figure, including a motor 21, a seat 23 with a battery contained thereunder with an electrical system (hidden), and a front end 27 with a steering handlebar which includes an electrical system headlight on/off switch 25. However, in this case, the electrical system has been modified in accordance with FIG. 1 above, and the headlight 33 and base 29 is removable as a single unit headlight/flashlight device. The flashlight base 29 is physically mounted to ATV 20 and is retained by strap 31.

Figure 3:
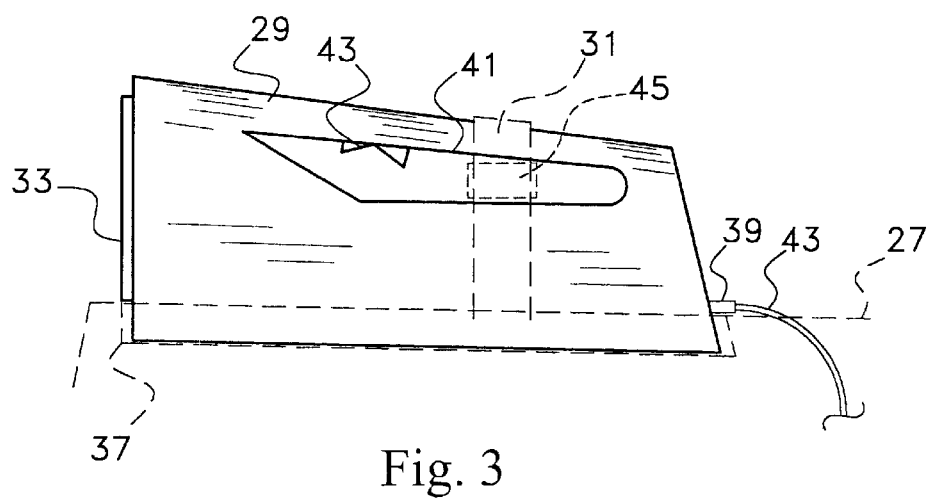
FIG. 3 shows a side partial view thereof; and, FIG. 4 illustrates a perspective view of a present invention motorcycle vehicle and removable headlight/flashlight.

FIG. 3 shows headlight 33 and flashlight base 29 in more detail, and identical parts to FIG. 2 are identically numbered here. As shown, there is a removable electrical contact component 39 with wire 47 to the main electrical system of ATM 20 in accordance with FIG. 1 above. Additionally, there is a handle 41 for carrying the flash-headlight device, and an on/off switch 43 for turning the light off and on when used in the removed or detached mode. Front end 27 has a recess 37 for holding the device in place, and with strap 31, retains the device in a fixed position when mounted on ATV 20. Strap 31 has a quick release 45 to enable a user to easily remove the device from the ATV. Base 29 includes an energy pack for powering the light when it is removed from the ATV, as shown in FIG. 1.

The positioning of the components of the FIGS. 2 and 3 device, or any such device of the present invention, and the exact type of components may be changed without exceeding the scope of the present invention, and the vehicle itself may be any motorized vehicle for human transport. For example, instead of a strap for securing the device to the vehicle, any means which would removably secure the device could be used, such as luggage clips, screws, swivel latches, chords, Velcro loop and hook fasteners, quick release camps, and the like. The headlight could be one with low and high beam or only a single beam, and it could be dual headlights. The contacts could be plug types for manual removal or could be any form of contact which would automatically disconnect upon removal of the device from the vehicle, such as rigidly fixed and aligned male/female contacts, e.g. flat or recessed. For maximum protection from weather and dirt, the contacts could be located on the underside of the device in a recess with foam surround for a tight seal.

Figure 4:
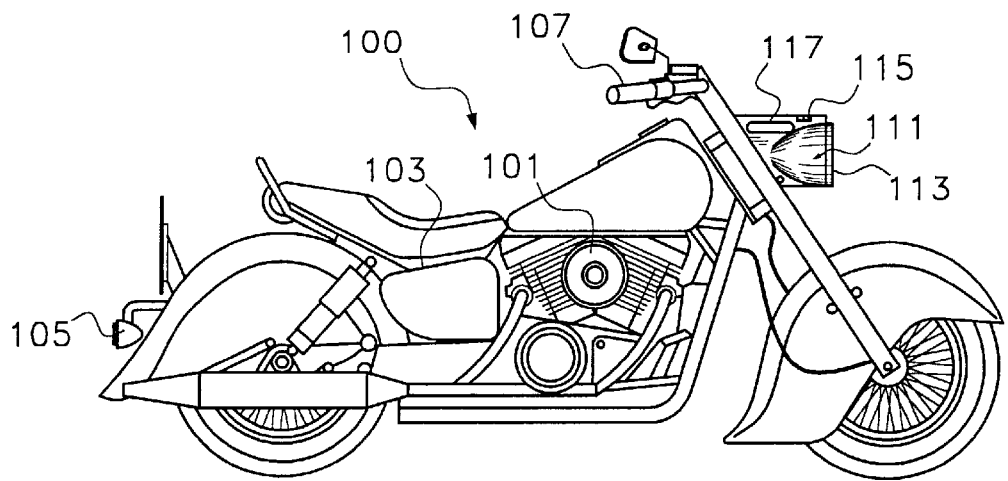
Figure 5:
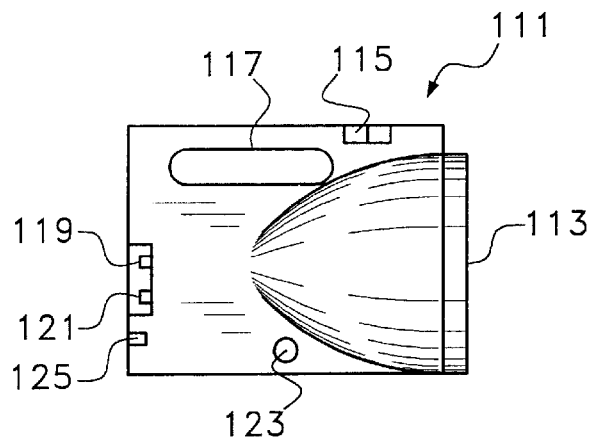
FIGS. 5 and 6 show side partial views thereof in the removed and mounted modes, respectively.
Figure 6:
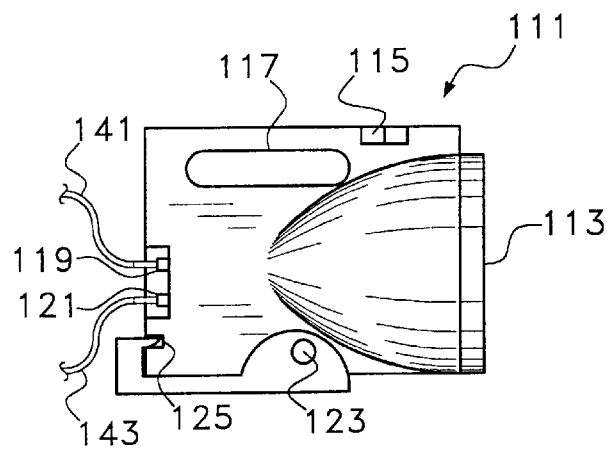

Referring now to FIGS. 4, 5, and 6, there is shown a vehicle motorcycle 100 with the flash/headlight feature of the present invention, as well as details of that feature. Motorcycle 100 is a present invention vehicle, but includes most of the conventional features as seen in the Figure, including a motor 101, a seat 103 with a battery contained thereunder with an electrical system (hidden), and a front end with a handlebar 107 which includes an electrical system headlight on/off switch and a rear end with a taillight 105. However, in this case, the electrical system has been modified in accordance with FIG. 1 above, and the headlight 113 and base 111 is removable as a single unit headlight/flashlight device. The flashlight base 111 is physically mounted to the front end of motorcycle 100 and is retained by a quick release bolt 133 shown in FIG. 6.

Referring to both Figures collectively, FIGS. 5 and 6 show headlight 33 and flashlight base 111 in more detail in the unmounted and mounted modes respectively, with identical parts to FIG. 4 identically numbered. As shown, there are removable electrical contact components 141 and 143 from the main electrical system of motorcycle 100 arranged in accordance with FIG. 1 above for charging the energy pack and for powering the headlight when mounted on the motorcycle 100. They are insertable and removable from contact recepticles 119 and 121. There is a handle 117 on base 111 for carrying the flash-headlight device, and an on/off switch 115 for turning the light off and on when used in the unmounted or detached mode. Base 111 includes an energy pack for powering the light when it is removed from the motorcycle, as shown in FIG. 1.

The motorcycle front end has a base holding tray 131 for holding the base 111 in place, and with bolt 133, retains the base 111 in a fixed position when mounted. Bolt 133 has two positions achieved by rotation, one inserted into orifice 123 and the other, unscrewed away from orifice 123 for unmounting. Recess 125 on base 111 and protrusion 137 on tray 131interact to maintain position of the base when mounted.

Obviously, numerous modifications and variations of the present invention are possible in light of the above teachings. It is therefore understood that within the scope of the appended claims, the invention may be practiced otherwise than as specifically described herein.

What is claimed is:

1. In a motorized vehicle for human transport having an electrical system for operation of and including at least one headlight, the improvement which comprises:

(a) a flashlight base to which one of said to at least one headlight is connected and being referred to herein as the flash-headlight, said base and said flash-headlight being removably mounted on said vehicle, said base having a rechargeable energy pack for powering said flash-headlight when said base and flash-headlight are removed from said vehicle, said base having an on/off switch operable when said base and flash-headlight are removed from said vehicle;

(b) a disconnectable powering electrical contact connected from said vehicle electrical system to said flash-headlight for powering and operation thereof when said flash-headlight is not removed from said vehicle and a conventional headlight switch is activated, and adapted for disconnection from said flash-headlight for removal of said base and flash-headlight from said vehicle;

(c) a recharging unit for recharging said rechargeable energy pack as needed, said recharging unit having a disconnectable charger electrical contact connected therefrom to said rechargeable energy pack for operation thereof when said vehicle is operating and said base and flash-headlight are not removed from said vehicle, and adapted for disconnection from said energy pack for removal of said base and flash-headlight from said vehicle; and, (d) securing means for securing said base and said flash-headlight to said vehicle when mounted thereon.

2. The improvement of claim 1 wherein said motor vehicle is a single headlight motor vehicle.

3. The improvement of claim 1 wherein said energy pack is a rechargeable battery pack.

4. The improvement of claim 1 wherein said vehicle is selected from the group consisting of motorcycles, all terrain vehicles and snowmobiles.

5. The improvement of claim 1 wherein said securing means is a lockable/unlockable securing means.

6. The improvement of claim 1 wherein said securing means is a releasable strap.

7. The improvement of claim 1 wherein said securing means is a releasable cover.

8. The improvement of claim 1 wherein said flashlight base is a plastic encasement with means for securing and unsecuring said flash-headlight with means for securing and unsecuring an energy pack, so as to permit replacement of said flash-headlight and said energy pack, as needed.

9. The improvement of claim 1 wherein said disconnectable powering electrical contact and said disconnectable charger electrical contact are separate electrical connections a single disconnectable electrical contact.

10. The improvement of claim 1 wherein said disconnectable powering electrical contact and said disconnectable charger electrical contact are a single disconnectable electrical contact.

11. A vehicle and flashlight-headlight combination, which comprises:

(a) an open air motorized vehicle for human transport, having a vehicle electrical system for operation of at least one headlight;

(b) at least one headlight;

(c) a flashlight base to which one of said to at least one headlight is connected and being referred to herein as the flash-headlight, said base and said flash-headlight being removably mounted on said vehicle, said base having a rechargeable energy pack for powering said flash-headlight when said base and flash-headlight are removed from said vehicle, said base having an on/off switch operable when said base and flash-headlight are removed from said vehicle;

(d) a disconnectable powering electrical contact connected from said vehicle electrical system to said flash-headlight for powering and operation thereof when said flash-headlight is not removed from said vehicle and a conventional headlight switch is activated, and adapted for disconnection from said flash-headlight for removal of said base and flash-headlight from said vehicle;

(e) a recharging unit for recharging said rechargeable energy pack as needed, said recharging unit having a disconnectable charger electrical contact connected therefrom to said rechargeable energy pack for operation thereof when said vehicle is operating and said base and flash-headlight are not removed from said vehicle, and adapted for disconnection from said energy pack for removal of said base and flash-headlight from said vehicle; and, (f) securing means for securing said base and said flash-headlight to said vehicle when mounted thereon.

12. The combination of claim 11 wherein said motor vehicle is a single headlight motor vehicle.

13. The combination of claim 11 wherein said energy pack is a rechargeable battery pack.

14. The combination of claim 11 wherein said vehicle is selected from the group consisting of motorcycles, all terrain vehicles and snowmobiles.

15. The combination of claim 11 wherein said securing means is a lockable/unlockable securing means.

16. The combination of claim 11 wherein said securing means is a releasable strap.

17. The combination of claim 11 wherein said securing means is a releasable cover.

18. The combination of claim 11 wherein said flashlight base is a plastic encasement with means for securing and unsecuring said flash-headlight with means for securing and unsecuring an energy pack, so as to permit replacement of said flash-headlight and said energy pack, as needed.

19. The combination of claim 11 wherein said disconnectable powering electrical contact and said disconnectable charger electrical contact are separate electrical connections a single disconnectable electrical contact.

20. The combination of claim 11 wherein said disconnectable powering electrical contact and said disconnectable charger electrical contact are a single disconnectable electrical contact.

* * * * *